(12) United States Patent
Suetome et al.

(10) Patent No.: US 8,430,113 B2
(45) Date of Patent: Apr. 30, 2013

(54) METHOD OF MANUFACTURING VALVE, AND VALVE PRODUCED BY THE METHOD

(75) Inventors: Sueyoshi Suetome, Nobeoka (JP); Takahiro Okada, Nobeoka (JP)

(73) Assignee: Asahi Organic Chemicals Industry Co., Ltd., Nobeoka-Shi, Miyazaki (JP)

( * ) Notice: Subject to any disclaimer, the term of this patent is extended or adjusted under 35 U.S.C. 154(b) by 538 days.

(21) Appl. No.: 12/595,806

(22) PCT Filed: Apr. 23, 2008

(86) PCT No.: PCT/JP2008/058303
§ 371 (c)(1),
(2), (4) Date: Oct. 13, 2009

(87) PCT Pub. No.: WO2008/136490
PCT Pub. Date: Nov. 13, 2008

(65) Prior Publication Data
US 2010/0065763 A1 Mar. 18, 2010

(30) Foreign Application Priority Data

Apr. 26, 2007 (JP) ................................ 2007-117001

(51) Int. Cl.
*F16K 1/22* (2006.01)
(52) U.S. Cl.
USPC ................... 137/15.25; 137/315.22; 251/305; 251/368; 29/890.127
(58) Field of Classification Search ................... 251/305, 251/368; 137/15.25, 315.22; 29/890.127
See application file for complete search history.

(56) References Cited

U.S. PATENT DOCUMENTS

| 3,050,781 A | * | 8/1962 | Killian | 264/275 |
| 3,784,157 A | * | 1/1974 | Wenglar | 251/306 |
| 4,038,358 A | * | 7/1977 | Wrasman | 264/242 |
| 4,103,866 A | * | 8/1978 | Robinson | 251/151 |
| 4,348,006 A | * | 9/1982 | Schmitt et al. | 251/288 |

(Continued)

FOREIGN PATENT DOCUMENTS

| CN | 2112732 U | 8/1992 |
| CN | 2428639 Y | 5/2001 |

(Continued)

OTHER PUBLICATIONS

Official Action dated May 25, 2011, issued by the Chinese Patent Office in corresponding Chinese Patent Application No. 200880013418.9, and English language translation of the Official Action.

(Continued)

*Primary Examiner* — Eric Keasel
*Assistant Examiner* — Minh Le
(74) *Attorney, Agent, or Firm* — Buchanan Ingersoll & Rooney PC

(57) ABSTRACT

A valve has a valve body provided on its inner peripheral surface with a seat ring, a stem arranged to extend in a direction substantially perpendicular to the axis of a flow passage defined in the valve body, and a valve element rotatably supported through a bush attached to the stem, and opens or closes the flow passage by pressing or separating the valve element against or from the seat ring in the valve body in accordance with the rotation of the valve element. The valve body is molded after the valve element, the seat ring, the stem, and the bush are placed in predetermined positions in a mold.

1 Claim, 9 Drawing Sheets

U.S. PATENT DOCUMENTS

| | | | | |
|---|---|---|---|---|
| 4,399,833 A * | 8/1983 | Holtgraver | ............... | 137/315.22 |
| 4,413,393 A * | 11/1983 | Schils | ...................... | 29/890.127 |
| 4,605,201 A * | 8/1986 | Miyazaki | ...................... | 251/305 |
| 4,773,625 A * | 9/1988 | Calvin | .......................... | 251/306 |
| 4,774,750 A * | 10/1988 | Platusich | ................. | 29/890.127 |
| 5,314,165 A * | 5/1994 | Raymond et al. | ............. | 251/305 |
| 5,615,861 A | 4/1997 | Pollmann et al. | | |
| 6,189,860 B1 * | 2/2001 | Sato et al. | ...................... | 251/306 |
| 6,354,267 B1 * | 3/2002 | Kotchi et al. | ............... | 123/337 |
| 6,439,255 B1 * | 8/2002 | Chamberlain | ............. | 137/15.25 |
| 6,901,942 B2 * | 6/2005 | Krimmer et al. | ........... | 137/15.25 |
| 7,090,193 B2 * | 8/2006 | Kamesawa | ..................... | 251/305 |
| 7,455,045 B2 * | 11/2008 | Sugiyama et al. | ............ | 123/337 |
| 7,744,061 B2 * | 6/2010 | Isogai et al. | .................. | 251/208 |
| 2001/0013586 A1 * | 8/2001 | Torii et al. | ..................... | 251/305 |
| 2001/0025085 A1 * | 9/2001 | Teshima et al. | ................ | 525/315 |
| 2002/0023347 A1 * | 2/2002 | Hannewald et al. | ..... | 29/890.124 |
| 2003/0178596 A1 * | 9/2003 | Gomi et al. | .................... | 251/305 |
| 2003/0209682 A1 | 11/2003 | Jessberger et al. | | |
| 2006/0048388 A1 | 3/2006 | Lorenz et al. | | |
| 2006/0186367 A1 * | 8/2006 | Kai | ............................... | 251/305 |
| 2007/0098978 A1 * | 5/2007 | Tanaka et al. | .................. | 428/336 |
| 2007/0102661 A1 * | 5/2007 | Isogai et al. | .................... | 251/305 |
| 2007/0245561 A1 | 10/2007 | Miyauchi et al. | | |
| 2010/0090148 A1 * | 4/2010 | Deiss et al. | ................... | 251/305 |

FOREIGN PATENT DOCUMENTS

| | | |
|---|---|---|
| EP | 1 051 567 A1 | 11/2000 |
| GB | 2 008 227 A | 5/1979 |
| JP | 54-094631 U | 7/1979 |
| JP | 54-099224 A | 8/1979 |
| JP | 02-076980 A | 3/1990 |
| JP | 03-208617 A | 9/1991 |
| JP | 7-305779 A | 11/1995 |
| JP | 8-285094 A | 11/1996 |
| JP | 2535383 Y2 | 2/1997 |
| JP | 10017652 A * | 1/1998 |
| JP | 11-153243 A | 6/1999 |
| JP | 2006-077770 A | 3/2006 |
| WO | WO 2005/116422 A1 | 12/2005 |

OTHER PUBLICATIONS

International Search Report (PCT/ISA/210) for PCT/JP2008/058303 mailed Aug. 5, 2008.

Office Action issued on Aug. 4, 2010 by the Chinese Patent Office in Chinese Patent Application No. 20080013418.9, and English language translation of Office Action.

Extended European Search Report dated Feb. 26, 2013 issued by the European Patent Office in corresponding European Patent Application No. 08740971.0.

* cited by examiner

_US 8,430,113 B2_

METHOD OF MANUFACTURING VALVE, AND VALVE PRODUCED BY THE METHOD

FIELD OF THE INVENTION

This invention relates to a valve which can be advantageously used for pipe lines for chemical plants, water and sewerage systems, agriculture and fisheries, food manufacturing, pharmaceutical manufacturing, etc. Specifically, the invention relates to a valve manufacturing method which can dramatically reduce the number of assembling processes and improve assembling efficiency, and a valve produced by the method.

BACKGROUND ART

As shown in FIG. 7, a conventional valve is provided with split upper and lower valve bodies 37 and 38, in which a flow passage 43 is formed, a seat ring 39 fitted in the upper valve body 37 and the lower valve body 38, a stem 40 extending through the seat ring 39 and supported to be substantially perpendicular to the axis of the flow passage 43, and a disc-shaped valve element 41 rotatably supported in the flow passage 43 by the stem 40. The rotation of the stem 40 causes the valve element 41 to rotate to be pressed against or separated from the seat ring 39 so that the valve is opened or closed.

The valve is usually produced by individually manufacturing the upper valve body 37 and the lower valve body 38, the seat ring 39, the stem 40, and the valve element 41 by the respective manufacturing processes, thereafter assembling the upper valve body 37 and the lower valve body 38 with a bolt 42, and adjusting the assembly. However, the assembling process has the following problems.

1. When fitting the seat ring 39 onto the inner peripheral surface of the hollow cylindrical valve body, if the seat ring 39 has a high hardness, it is difficult to assemble them. If the seat ring 39 is made of a material such as fluorine resin, etc., which is difficult to deform, it is necessary to make and assemble split halves consisting of the upper valve body 37 and the lower valve body 38, thus leading to an increase in the number of the assembling processes.
2. When fitting the valve element 41 on the inner peripheral surface side of the seat ring 39, the valve element 41 compresses and deforms the seat ring 39 to provide a certain sealing performance, and therefore the diameter of the inner peripheral surface of the seat ring 39 is smaller than that of the outer peripheral surface of the valve element 41. Consequently, a large force is necessary to fit the valve element 41, which makes the assembling difficult. Particularly, when fitting the valve element 41 into the fluoroplastic seat ring 39, it is necessary to first assemble the valve element 41 into the fluoroplastic seat ring 39, and then assemble them together with the split upper and lower valve bodies 37 and 38, because it is otherwise difficult to assemble the valve element 41 into the fluoroplastic seat ring 39 already fitted to the hollow cylindrical valve body. This increases the number of assembling processes.

As a method of solving the above problems, FIG. 8 shows a valve having a valve body 44 which is symmetrically splittable along a split surface 49 perpendicular to a flange face 50 and passing through the axis of a stem 45 and which is provided with a large number of holes opening toward the split surface 49 for lightening, and fastening devices to join the split halves of the valve body 44 together at the split surface 49 (see Japanese unexamined Patent Publication No. 7-305779).

FIG. 9 shows another known valve having a valve body 51, which is symmetrically splittable along a split surface 56 parallel to a flange face 57 and passing through the axis of a stem 52 and which is provided with a large number of holes opening toward the split surface 56 for lightening, and fastening devices to join the split halves of the valve body 51 together at the split surface 56 (see Japanese unexamined Patent Publication No. 8-285094).

According to the publications, not only can the weight of the valve body 44 or 51 be reduced by forming the holes, but also secondary machining to form through holes in the inner periphery of the valve body 44 or 51 and in the stem 45 or 52 is not necessary. In addition a pair of valve body halves 44 or 51 can be molded by a single mold, because they are symmetrical with respect to the axis of the stem 45 or 52. As a result, facilitation of the assembly, cost reduction, and mass production can be realized.

However, as the fastening devices for the split halves of the valve body 44 or 51 is comprised of the clamp 46 or 53 consisting of split halves, the securing flange 47 or 54, and a bolt 48 or 55, it is inevitable that the number of components is increased and troublesome operations for fastening the valve body 44 or 51 are involved.

The present invention has been completed to eliminate the above-mentioned drawbacks in the prior art. An object of the present invention is to provide a valve manufacturing method in which a seat ring and a valve body can be easily assembled together without splitting the valve body, and to provide a valve.

DISCLOSURE OF THE INVENTION

According to the present invention, there is provided a method for manufacturing a valve which comprises a valve body provided on its inner peripheral surface with a seat ring, a stem arranged to extend in a direction substantially perpendicular to the axis of a flow passage defined in the valve body, and a valve element rotatably supported through a bush attached to the stem, and which opens or closes the flow passage by pressing or separating the valve element against or from the seat ring of the valve body in accordance with the rotation of the valve element; in which the valve body is molded after placing the valve element, the seat ring, the stem, and the bush in predetermined positions in a mold.

According to an embodiment of the present invention, the valve body is molded after a bearing attached to the outer periphery of the upper part of the stem and rings attached around through holes which are provided at the upper part and the lower part of the outer periphery of the seat ring are further placed in the mold.

According to another embodiment of the present invention, a valve comprising a valve body provided on its inner peripheral surface with a seat ring, a stem arranged to extend in a direction substantially perpendicular to the axis of a flow passage defined in the valve body, and a valve element rotatably supported through a bush attached to the stem, and which opens or closes the flow passage by pressing or separating the valve element against or from the seat ring of the valve body in accordance with the rotation of the valve element; the valve body is made from a resin including at least one of norbornene resin, vinyl resin, olefin resin, fluorine resin, aromatic resin, and urea resin, which can be molded by injection molding or reaction injection molding.

A material for the valve body, which can be molded by injection molding, may include vinyl chloride resin, chlorinated vinyl chloride resin, vinylidene chloride resin, propylene resin, or vinylidene fluoride resin. Specifically, vinyl chloride resin can be used because it is a general-purpose resin and has well-balanced properties.

A material for the valve body, which can be molded by reaction injection molding, may include unsaturated polyester resin, vinylester resin, epoxy resin, dicyclopentadiene resin, urethane resin, unsaturated polyurethane resin, acrylic resin, acrylic urethane resin, or, nylon resin. Specifically, dicyclopentadiene resin is preferable.

According to another embodiment of the present invention, any one of chemical resistant paint, solvent resistant paint, oil-resistant paint, and weather-resistant paint is applied to the valve body.

As a material applied to the valve body, epoxy paint, urethane paint, acrylic paint, or fluorine paint can be advantageously used, however, any other materials whose property is superior to that of the valve body 1 in at least one of chemical resistance, solvent resistance, oil-resistance, and weather-resistance also can be equally used.

According to another embodiment of the present invention, the stem is rotated by manual, electrical, or pneumatical drive.

In the present invention, 'rigidity' indicates not only a property of a used material, but also the rigidity depending on the shape of a component. For example, if a material of the valve body is inferior in rigidity to a material of the seat ring, the rigidity of the valve body can be increased by making the wall thickness of the valve body sufficiently larger than that of the seat ring in the radial direction with respect to the central axis of the flow passage in the valve body, or by changing the geometrical shape of the valve body.

Hereinafter, embodiments of the invention will be described with reference to the drawings. However, the present invention is not limited to the embodiments.

BEST MODE FOR CARRYING OUT THE INVENTION (First Embodiment)

Figure 1:
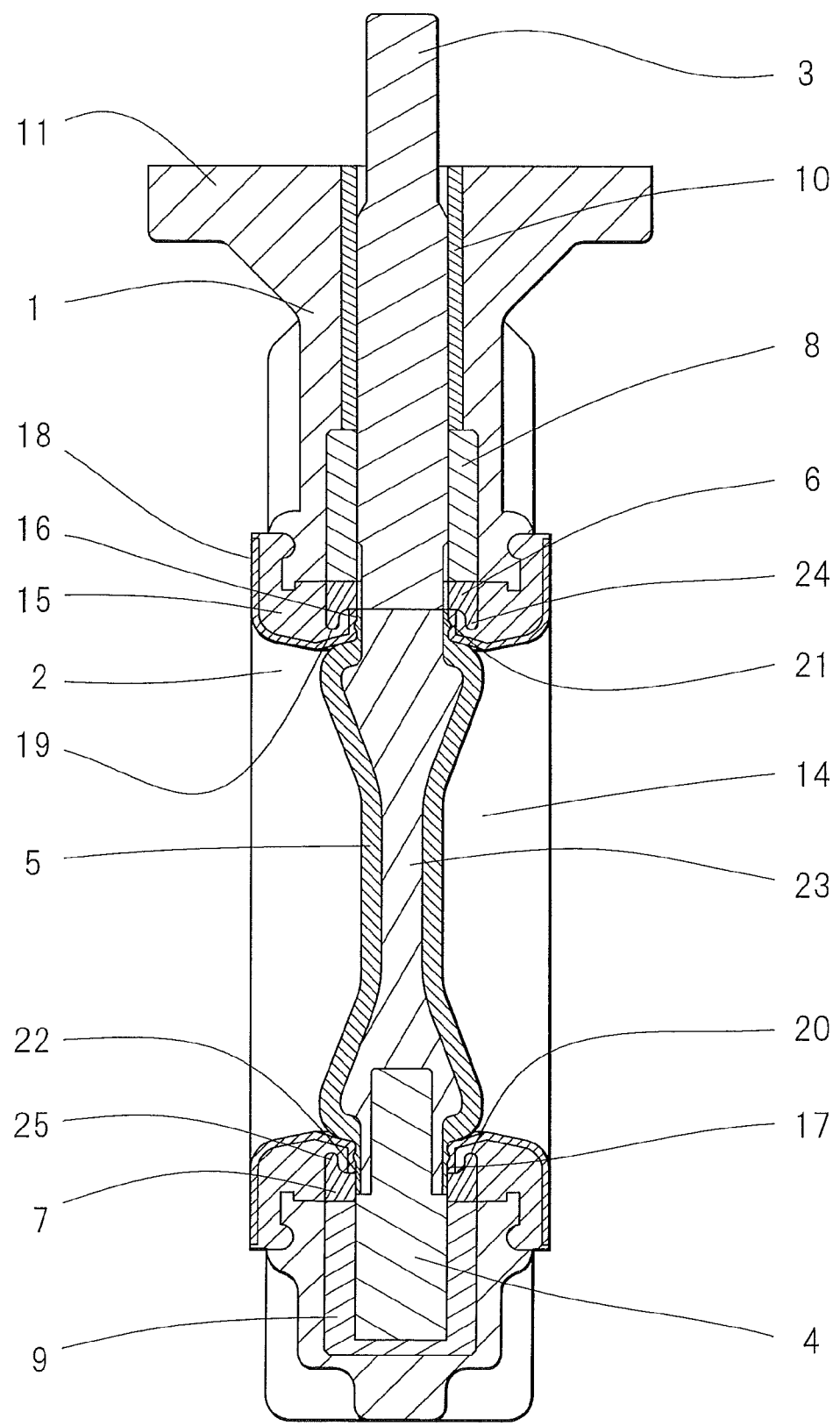
FIG. 1 is a longitudinal sectional view of a valve according to the first embodiment of the invention.

FIG. 1 shows a valve according to the present invention. The valve is provided with a valve body 1 having an annular seat ring 2 on the inner peripheral surface thereof, an upper stem 3 and a lower stem 4, which are arranged to extend in a direction substantially perpendicular to the axis of a flow passage 14 defined in the valve body 1, and a valve element 5 rotatably supported through an upper bush 8 and a lower bush 9 which are attached to the upper stem 3 and the lower stem 4, respectively.

Thus, the valve operates to close or open the flow passage 14 when the valve element 5 is rotated to press or separate the valve element against or from the seat ring 2 in the valve body 1.

Figure 2:
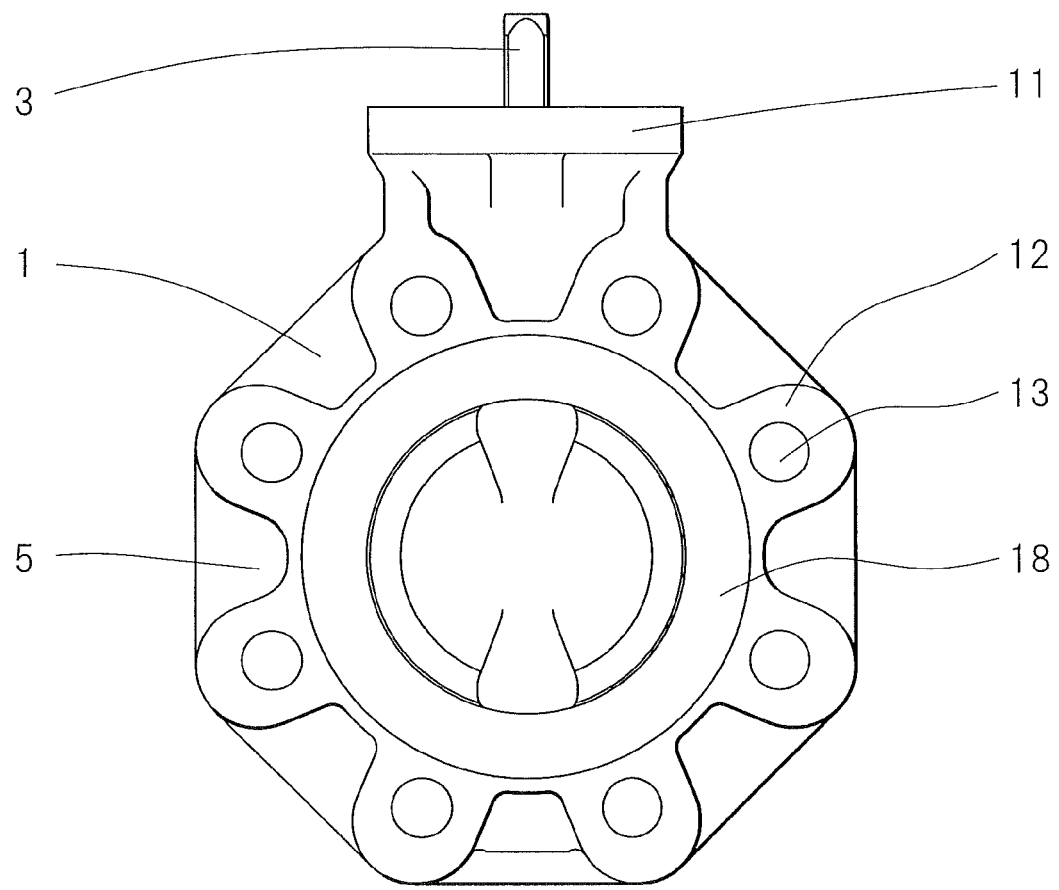
FIG. 2 is a front elevational view of a valve according to the first embodiment of the invention, in the state of fully-closed.

The valve body 1 in FIGS. 1 and 2 is made of a hollow cylinder of, for example, dicyclopentadiene (hereinafter referred to as DCPD) which defines therein the flow passage 14. At the top of the valve, a generally disc-like top flange 11 projecting from its periphery is provided.

The seat ring 2 is a hollow cylinder of which the portion in contact with a liquid is made from PTFE (which will hereinafter be described in detail). A seat cushion 15 made from CR (described below) is formed integrally with the liquid non-contacting portion of the seat ring.

At opposite ends of the seat ring 2, flange sealing surfaces 18 are provided to cover the sides of the seat cushion 15.

The seat ring 2 is fitted to the inner peripheral surface of the valve body 1. At the upper part and lower part of the liquid non-contacting portion, which is defined by the outer peripheral surface of the seat ring 2, through holes 16 and 17 are provided symmetrically.

The material of which the seat ring 2 is made may include, but is not limited to, as long as required strength and corrosion-resistance are provided, vinyl chloride resin, chlorinated vinyl chloride resin, vinylidene chloride resin, propylene resin, tetrafluoroethylene resin (hereinafter referred to as PTFE), tetrafluoroethylene-perfluoro alkyl vinyl ether copolymer, tetrafluoroethylene-hexafluoropropylene copolymer, tetrafluoroethylene-ethylene copolymer, vinylidene fluoride resin, polychlorotrifluoroethylene, ethylene-chlorotrifluoroethylene copolymer, ethylene-propylene rubber, fluoro rubber, chloroprene rubber (hereinafter referred to as CR), acrylonitrile-butadiene rubber, styrene-butadiene rubber, butyl rubber, chlorinated polyethylene, chlorosulfonated polyethylene, natural rubber, isoprene rubber, butadiene rubber, hydrogenated nitrile rubber, vulcanized rubber of a blend of acrylonitrile-butadiene rubber and polyvinyl chloride, urethane rubber, acrylic rubber, chlorinated butyl rubber, brominated butyl rubber, perfluoro rubber, epichlorohydrin rubber, silicone rubber, fluorosilicone rubber, or the laminates of the above materials.

The upper stem 3 which is exposed above the seat ring 2 is preferably provided with a cylindrical bearing 10 to prevent the ingress of resin.

In this embodiment, the material of which the upper stem 3 and the lower stem 4 are made is SUS 304, but not limited thereto as long as the necessary strength is provided, and can be, for example, cast iron, cast steel, carbon steel, stainless steel, or titanium, etc.

The upper stem 3 and the lower stem 4 are arranged to extend in a direction substantially perpendicular to the axis of the flow passage 14, and are rotatably supported in the valve body 1.

The upper stem 3 extends through the bearing 10, the upper bush 8, the upper ring 6, and the seat ring 2, and is connected to the top of a valve element insert 23 (described below).

Furthermore, the upper end of the upper stem 3 protrudes from the center of the top flange 11 provided at the upper part of the valve body 1. The lower stem 4, connected to the lower portion of the valve element insert 23, extends through the seat ring 2 and the lower ring 7, and is received in the lower bush 9.

The valve element 5 has a disc shape, and is made of PTFE. The valve element 5 is formed integrally with the outer surface of the valve element insert 23, and located at the center of the inside of the valve body 1. At the upper part and the lower part of the valve element 5, respectively, a generally trapezoidal upper boss portion 21 and a generally trapezoidal lower boss portion 22 are formed symmetrically.

The material of the valve element 5 may include metal, thermoplastic resin, or thermosetting resin, etc., but is not limited thereto as long as the necessary strength is provided.

Rings 6 and 7 made of SUS 304 are attached to the upper stem 3 and the lower stem 4, so that the rings 6 and 7 are in close contact with the lower part of the upper bush 8 and the upper part of the lower bush 9, respectively.

The upper ring 6 has an annular shape, and is provided, at its one end, with an annular protrusion 24.

The upper ring 6, which is pressed at the other end thereof by the upper bush 8 to fit the annular protrusion 24 into an outer groove 19, is firmly fitted in the liquid non-contacting portion of the seat ring 2.

Likewise, the lower ring 7 also has an annular shape, and is provided, at its on end, with an annular protrusion 25. The lower ring 7, which is pressed, at the other end, by the lower bush 9 to fit the annular protrusion 25 into an outer groove 20, is firmly fitted in the liquid non-contacting portion of the seat ring 2.

In addition, the bushes 8 and 9 made of SUS 304 are attached to the upper stem 3 and the lower stem 4, respectively.

The upper bush 8 has a hollow cylindrical shape, and is, at its lower end surface and upper end surface, in close contact with the upper ring 6 and the bearing 10, respectively.

The lower bush 9 is made of a circular cylinder which defines a recess therein, and the upper end surface thereof is in close contact with the lower ring 7.

When the valve is fully closed, a load due to the hydraulic pressure in the passage is exerted on the fitting portions between the valve body 1 and the upper stem 3 and between the valve body 1 and the lower stem 4 through the upper stem 3 and the lower stem 4 in a direction parallel to the axis of the passage 14. To this end, the valve body 1 can be strengthened by the upper bush 8 and the lower bush 9.

As shown in FIG. 2, ribs 12 are formed on the periphery of the valve body 1 at predetermined intervals in the circumferential direction, and each of the ribs has a flange bolt hole 13.

The valve element 5 has the circular valve element insert 23 of SUS 304 enclosed therein.

Figure 3:
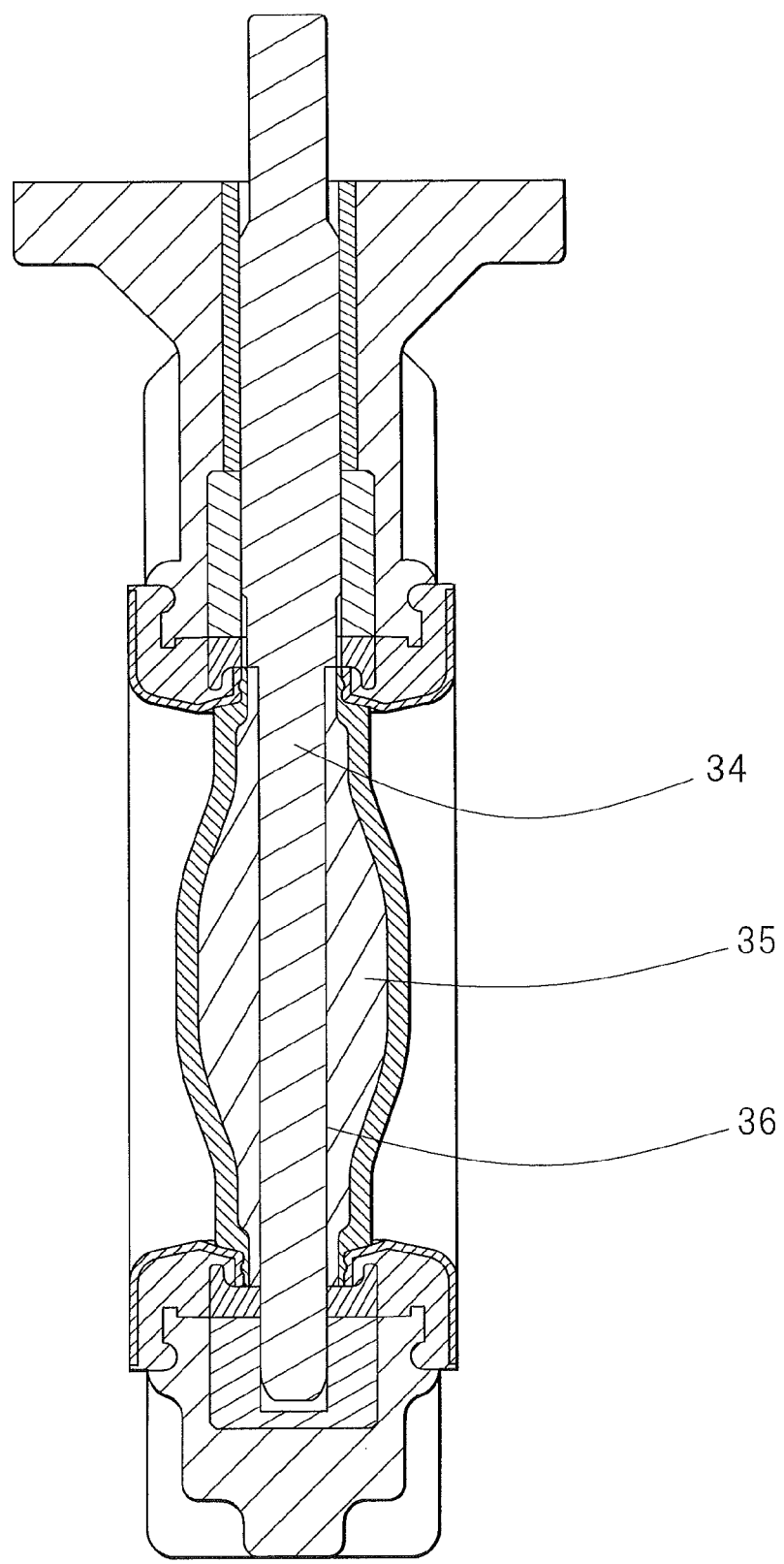
FIG. 3 is a vertical sectional view of a valve according to the first embodiment of the invention, in which another stem is used.

The upper part and the lower part of the valve element 5 in a direction perpendicular to the axis of the flow passage 14 are connected with the upper stem 3 and the lower stem 4, respectively. Regarding the relationship of the valve element insert 23 with the upper stem 3 and the lower stem 4, in this embodiment, the valve element insert 23 is fitted or bonded to the upper stem 3 and the lower stem 4 so as not to rotate. Alternatively, as shown in FIG. 3, it is possible to nonrotatably insert a stem 34 which is comprised of the upper stem 3 and the lower stem 4 integral therein into a stem hole 36 formed in the valve element insert 35.

The upper stem 3 and the lower stem 4 can be rotated by manual operation, electrical, or pneumatical drive.

The valve is mainly driven manually by operating a handle which is attached directly or through a gearbox to the one end of the upper stem 3, which protrudes from the valve body 1. However, the driving system of the valve is not specifically limited thereto and, the valve can be driven, for example, electrically by a motor or pneumatically by air pressure. When driving the valve electrically, an electrical drive 32 is mounted on the top flange 11 and connected to the upper part of the upper stem 3, instead of a handle or a gearbox.

Figure 4:
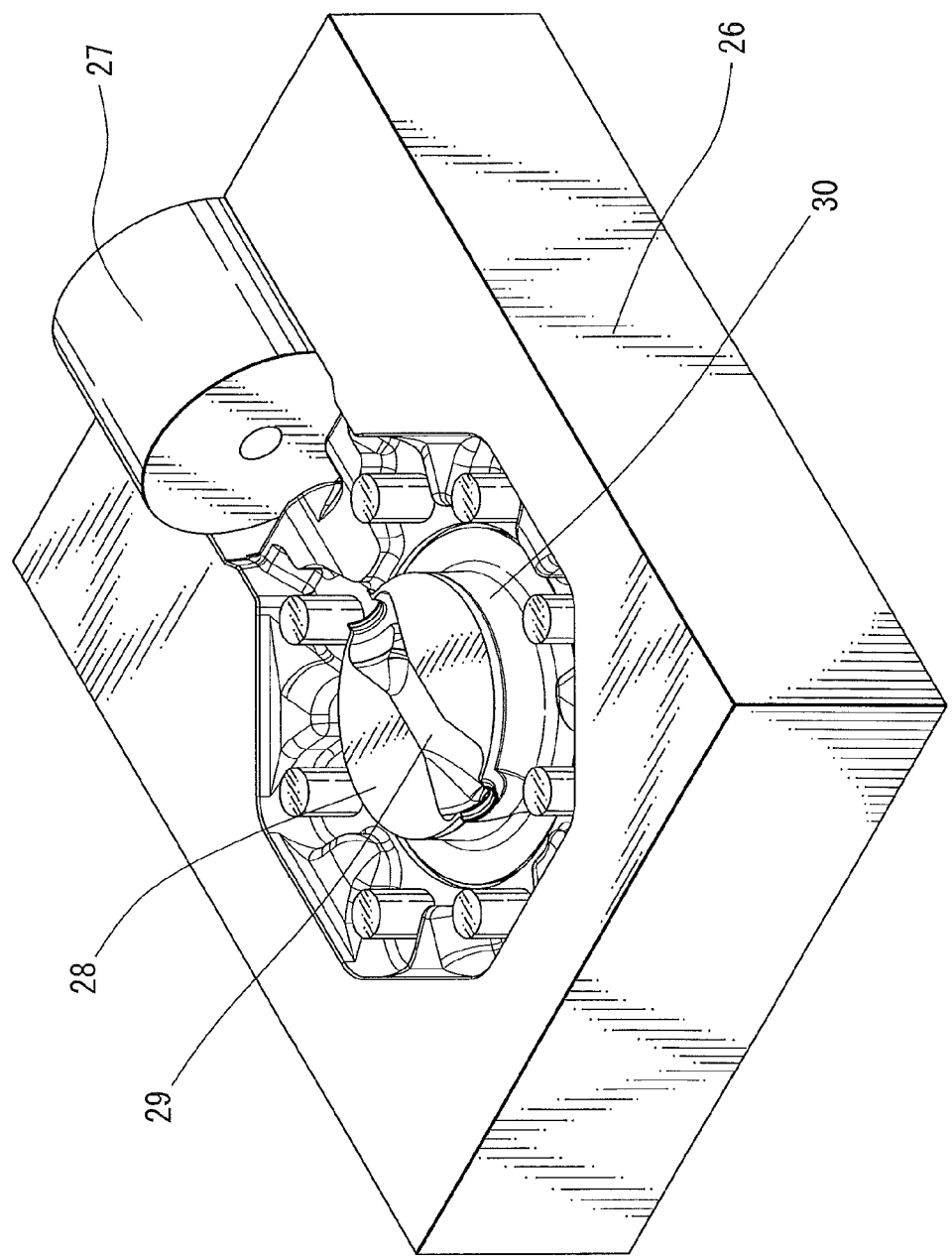
FIG. 4 is a schematic view indicating the position of a core in a molding die.
Figure 5:
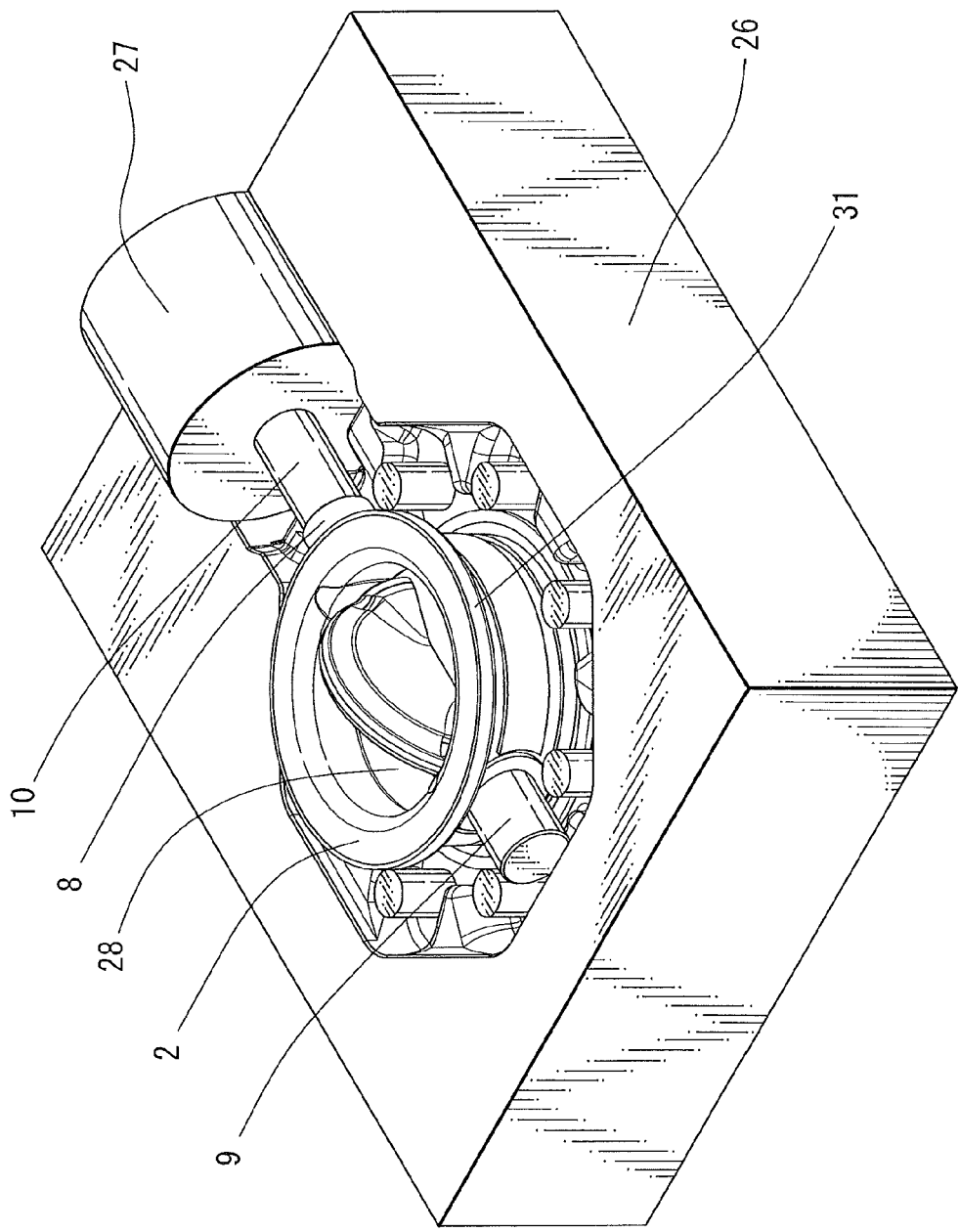
FIG. 5 is a schematic view indicating the location of each component in a molding die.

A die for molding the valve of this embodiment is shown in FIGS. 4 and 5. A die cavity has a shape substantially the same as the valve body 1. At the part of the die corresponding to the flow passage 14 of the valve body 1, a substantially cylindrical core 28 is provided. A groove 29 in which the valve element 5 can be placed in a direction substantially perpendicular to the flow passage 14 is formed in the upper surface of the core 28. A peripheral surface 30 of the core is shaped so that the seat ring 2 can be fitted thereon.

A sliding core 27 has a recess in which a part of the upper stem 3 can be inserted, so that the valve body 1 of which the part of the upper stem 3 protrudes from the top flange 11 can be easily removed from the mold 26 after molding.

Next, a method for manufacturing the valve will be described.

At first, the valve element 5, the seat ring 2, the upper stem 3 and the lower stem 4, the upper bush 8 and the lower bush 9, the upper ring 6 and the lower ring 7, and the bearing 10 are assembled in advance.

Upon assembling, first, the valve element 5 is inserted in the center of the flow passage 14 in the seat ring 2, and the upper boss portion 21 and the lower boss portion 22 of the valve element 5 are fitted into the through hole 16 and the through hole 17 of the seat ring 2.

The upper stem 3 and the lower stem 4 are fitted to the valve element insert 23 at the upper boss portion 21 and the lower boss portion 22, and placed to protrude from the through hole 16 and the through hole 17 of the seat ring 2.

The upper ring 6 and the lower ring 7 are fitted by fitting the protrusions 24 and 25 in the grooves 19 and 20 formed around the through holes 16 and 17 of the seat ring 2.

The upper bush 8 is fitted to the upper ring 6 so that the upper stem 3 extends in the upper bush. The bearing 10 is fitted to the upper bush 8 so that the upper stem 3 extends in the bearing.

The lower bush 9 receives therein the lower stem 4, and is fitted to the lower ring 7. The upper stem 3 and the lower stem 4 may be joined with the valve element insert 23.

Next, the valve element 5, the seat ring 2, the upper stem 3 and the lower stem 4, the upper bush 8 and the lower bush 9, the upper ring 6 and the lower ring 7, and the bearing 10, which are assembled together in advance, are placed on the core 28 in the mold 26.

On the other hand, the seat ring 2 is fitted on the peripheral surface 30 of the core 28. Here, it is necessary to prevent the sealing surface of the seat ring 2 from being damaged. At the same time, the flange sealing surface 18 or the side portion 31 of the flange sealing surface 18 must be brought into close contact with the cavity of the mold 26 to prevent the resin from entering the flow passage 14 of the seat ring 2 during a molding process.

After placing the parts into the mold 26, the sliding core 27 is slid in the direction of the axis of the upper stem 3 until the upper part of the upper stem 3, which is received in the center of the slide core 28, is closely connected to the bearing 10. After the sliding movement is completed, the mold 26 and another mold which has substantially the same shape as the mold 26 are opposed to each other and clamped together, and, a reaction liquid is introduced into the mold to perform reaction injection molding. After the polymerization of the reaction liquid is completed, the opposed molds are opened and thereafter the slide core 28 is moved until the upper stem 3 is exposed completely, then the valve is removed from the mold 26.

To maintain the sealing performance of the valve, the outer diameter of the core 28 is preferably designed taking molding shrinkage into consideration, so that a compression rate of the seat ring 2 by the valve element 5 is between 5 and 36 percent.

Next, the valve body 1 is molded by reaction injection molding. Prior to the reaction injection molding, a material for reaction injection molding which mainly consists of dicyclopentadiene monomer, metathesis catalyst, and aluminum activator is divided into two stable solutions, namely, Solution A consisting of dicyclopentadiene monomer and an aluminum activator and Solution B consisting of dicyclopentadiene monomer and a metathesis catalyst. These solutions are received in different tanks.

The temperature of the reaction liquid, which consists of Solution A or Solution B, is from 20° C. to 80° C., the viscosity thereof at 30° C., for example, is from 5 cps to 3100 cps and preferably from 30 cps to 800 cps.

To initiate the reaction injection molding, a mixer is controlled to mix Solution A and Solution B fed from the tanks, the mixture is filled as the reaction liquid in the molds, i.e., the mold 26 in which the parts were placed previously and the mold having substantially the same shape as the mold 26, which are opposed to each other and clamped together. By polymerization of the reaction liquid, the shaped valve is obtained.

The polymerization time can be selected appropriately, and, is usually from 20 seconds to 20 minutes after the completion of injection of the reaction liquid. The internal mold pressure is usually within the range from 0 to 100 $Kg/cm^2$. The injection pressure of the reaction liquid is preferably from $2 \times 10^5$ Pa to $5 \times 10^5$ Pa. The injection pressure should not be too low in order to obtain a mold product having a predetermined shape; but should not be too high in order to prevent a mold from having a higher rigidity, which is economically unacceptable.

In this embodiment, a metallic mold is used; however, a sand mold can be used. Alternatively, a mold made of synthetic resin can be used because reaction injection molding can be performed at a relatively low pressure.

(Second Embodiment)

Figure 6:
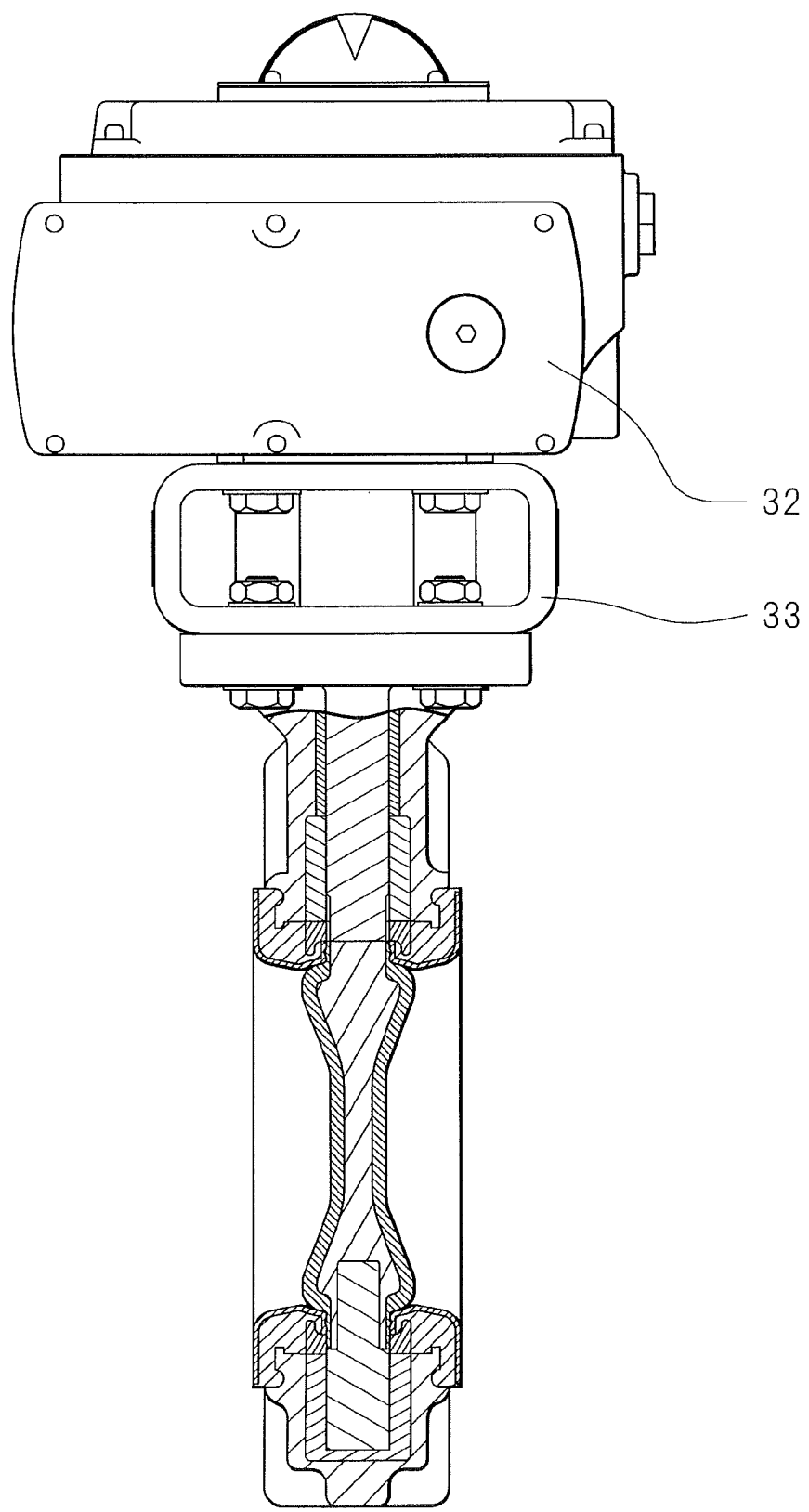
FIG. 6 is a partially sectioned sectional view of an electrically-driven valve according to the second embodiment of the invention.
Figure 7:
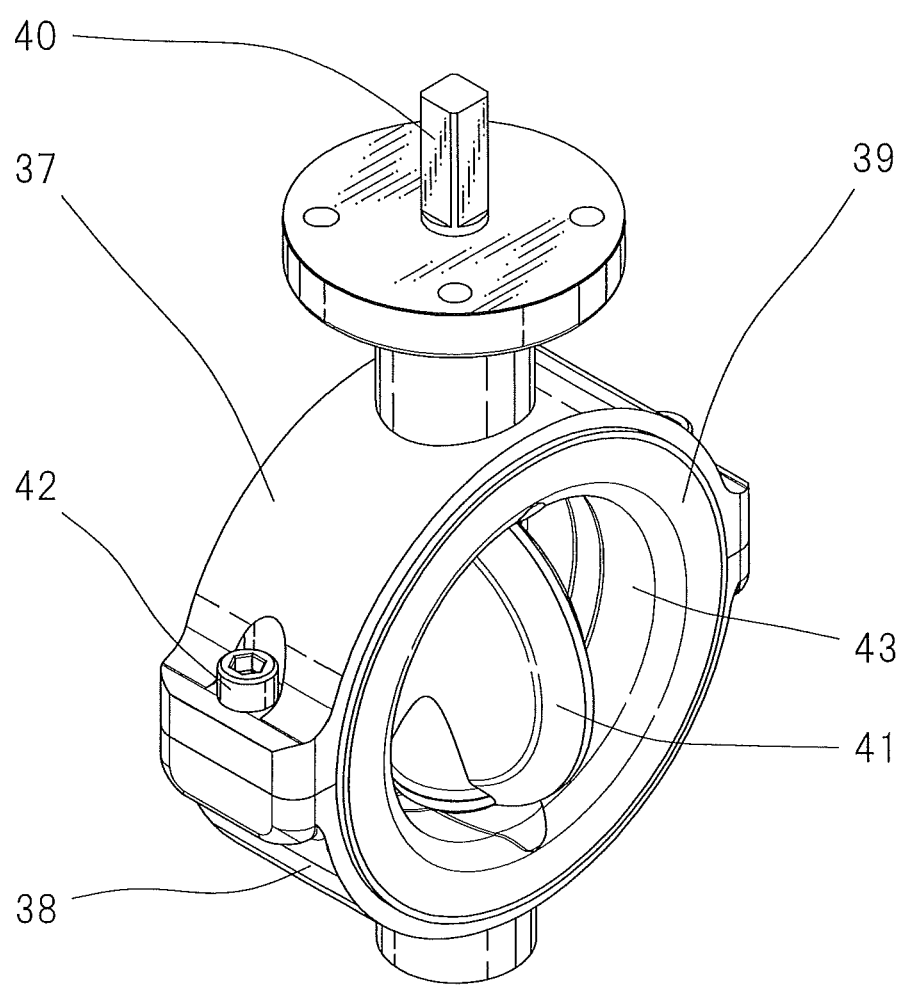
FIG. 7 is a perspective view indicating a known valve.
Figure 8:
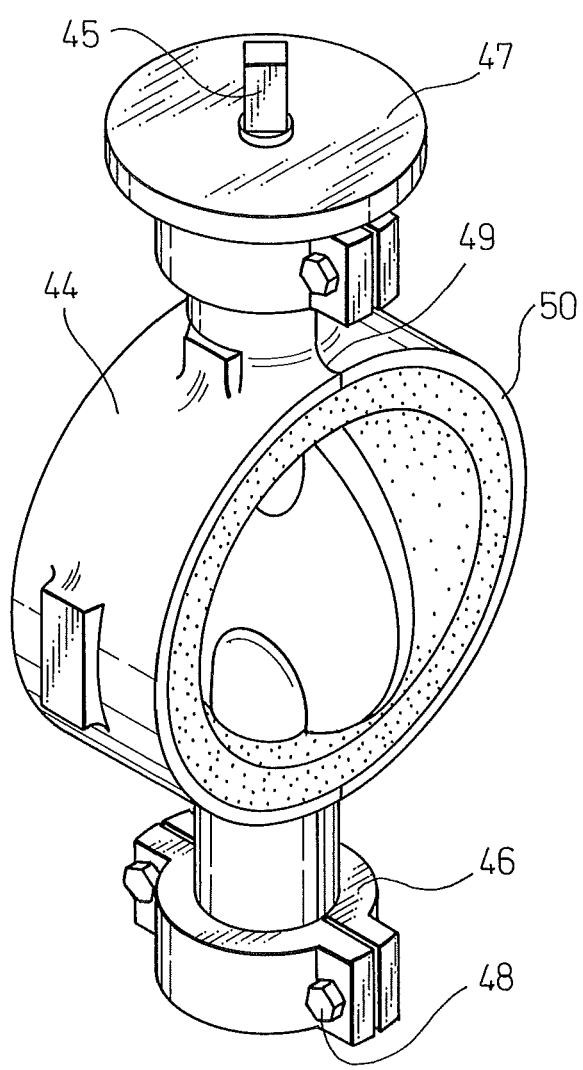
FIG. 8 is a perspective view indicating a known valve.
Figure 9:
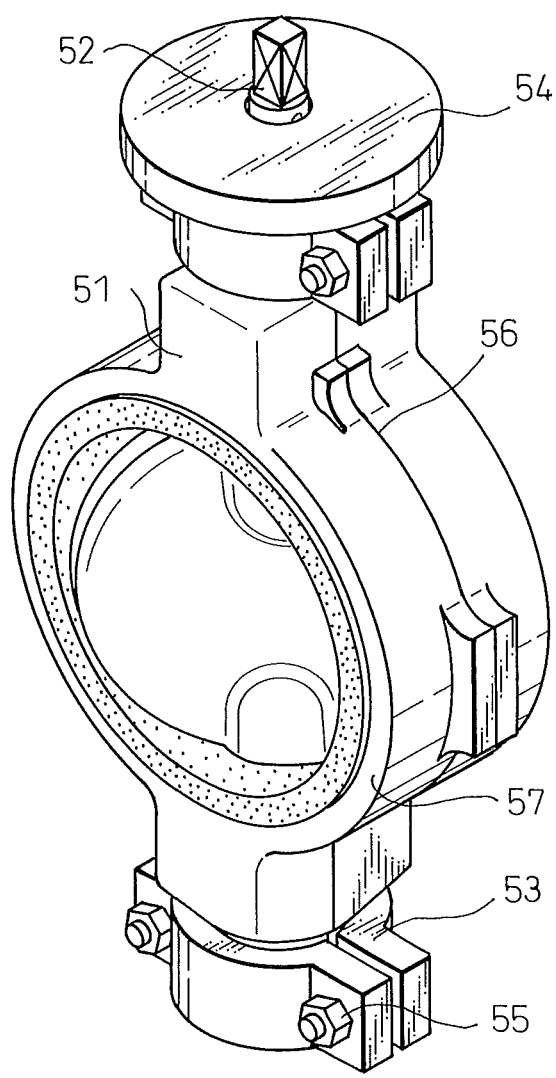
FIG. 9 is a perspective view indicating a known valve.

In FIG. 6, the electrical drive 32 using a motor is mounted on the top flange 11 of the valve body 1 through a mounting 33. The driving force of the electrical drive 32 is transmitted to the upper part of the upper stem 3 so that the stem 3 is rotated to rotate the valve element 5, to thereby open and close the valve. Instead of the electrical drive 32, a pneumatic drive using air pressure can be provided either through or not through the mounting.

Next, a comparison test and an evaluation test for the valve of the present invention were conducted in the following way.

(1) Comparison of Manufacturing Process

Comparison and evaluation of the manufacturing processes of the valve were made.

(2) Confirmation of the Sealing Property of the Valve Seat.

In conformity to the testing standard of the sealing property of a valve seat defined in JIS B 2032, when applying a water pressure of 1.1 MPa, which is 1.1 times higher than the maximum allowable pressure, for one minute to one side of the valve which was in a closed position, the presence or absence of leaks to the other side, an internal leakage of the valve seat, and leakage around the lower boss portion 22 were visually confirmed.

(3) Confirmation of Durability

The above sealing test was conducted when hot water at 98° C. was flown for 2 hours and cold water at 20° C. was flown for 1 hour while applying water pressure of 0.3 MPa to the valve which was in an open position. These operations were repeated 20 times or until it was found that the sealing property had decreased.

EXAMPLE 1

The comparison of the manufacturing processes, the valve seat sealing test, and the durability test were conducted using the valve (aperture diameter: 100 mm) according to the first embodiment of the present invention.

The valve used in the first embodiment was a butterfly valve which is provided with a hollow cylindrical valve casing having therein a flow passage, a seat ring fitted to the inner peripheral surface of the valve casing, a valve stem extending through a through hole of the seat ring and supported by the valve body, and, a valve disc rotatably supported in the flow passage of the valve casing by the valve stem in a direction substantially perpendicular to the axis of the flow passage, wherein the valve is opened or closed by rotating the valve body with the rotation of the valve stem.

The manufacturing process will be described below, and the evaluation results of the valve seat sealing test and the durability test are shown in Table 1. In Table 1, "good" indicates that no leakage occurred, "bad" indicates that leakage occurred.

Manufacturing Process (1) Assembling Process: seat ring 2, upper stem 3, lower stem 4, valve element 5, upper ring 6, lower ring 7, upper bush 8, lower bush 9, and bearing 10
(2) Molding Process: molding after placing all of the components in the assembling process into the mold 26
(3) Coating Process
(4) Driving Part Assembling Process
(5) Inspection Process
(6) Completion of the Product

COMPARATIVE EXAMPLE 1

The comparison of the manufacturing processes, the valve seat sealing test, and the durability test were conducted using the conventional valve in which the upper valve body 37 and the lower valve body 38 were joined by the bolt 42. The manufacturing processes will be described below, and the evaluation results of the valve seat sealing test and the durability test are shown in Table 1.

The upper valve body 37 and the lower valve body 38 were made from cast iron and of a split type structure, which were prepared by casting, machining the fitting parts of the seat ring 2, the upper stem 3, the upper bush 8 and the lower bush 9, and, powder coating of the surface with epoxy paint.

Manufacturing Process (1) Manufacturing Process (casting, machining, and coating): upper valve body 37, and lower valve body 38
(2) First Assembling Process: seat ring 39, stem 40, valve element 41, rings, and bushes
(3) Second Assembling Process: fitting all of the components of the first assembling process to the inner periphery of the upper valve body 37 and the lower valve body 38, and clamping the upper valve body 37 and the lower valve body 38 by the bolt 42.
(4) Driving Part Assembling Process
(5) Inspection Process
(6) Completion of the Product

TABLE 1

Evaluation results of the valve seat sealing test and the durability test

|  |  | Example 1 | Comparative example 1 |
|---|---|---|---|
| Valve seat sealing test |  | Good | Good |
| Durability test | 1 cycle | Good | Good |
|  | 2 cycles | Good | Good |
|  | 3 cycles | Good | Good |

TABLE 1-continued

Evaluation results of the valve seat sealing
test and the durability test

|  | Example 1 | Comparative example 1 |
|---|---|---|
| 5 cycles | Good | Good |
| 7 cycles | Good | Good |
| 10 cycles | Good | Good |
| 15 cycles | Good | Good |
| 20 cycles | Good | Good |

As described above, in the manufacturing process of Example 1, the manufacturing process of the valve body is drastically simplified as compared with that of Comparative example 1. This is because a casting process, a machining process, and a coating process are necessary for the upper valve body 37 and the lower valve body 38 in Comparative example 1, while the valve body 1 in Example 1 is produced only by a molding process. Furthermore, in Comparative example 1, as the number of the processes is increased, there are waiting times before the subsequent processes, thus, it requires more time than the process time necessary to perform the processes.

As shown in Table 1, comparing the performance of the valve, Example 1 has a sealing property and durability equal to those in Comparative example 1; it is confirmed that no difference in valve function occurs due to the difference in the manufacturing method of the valve body and the assembling method of the valve.

As explained above, the method for manufacturing a valve and the valve, according to the invention, bring about the following advantages.

(1) As the valve is formed by molding the valve body 1 after the valve element 5, the seat ring 2, the upper stem 3 and the lower stem 4, the upper bush 8 and the lower bush 9 are placed into the mold 26 in advance, the valve can work as a valve when the valve body 1 is completed. Therefore, it is not necessary to assemble the components produced separately, and the cost and the time required for assembling the valve can be drastically reduced.

(2) As the valve body 1 is not divided, a fastening device which is necessary to assemble the valve body 1 is unnecessary and the cost and the time required for assembling the valve can be reduced.

(3) Using resin which can be molded by reaction injection molding or injection molding makes it possible to select a material having an optimum flexibility so that a product which has both the sealing property and the rigidity can be realized for a piping element.

(4) As the paint applied to the valve body 1 is superior to the valve body 1 itself in at least one of chemical resistant, solvent resistant, oil-resistant, and, weather-resistant, the valve can be used in various environments by applying a paint suitable for the environment in which the valve is to be used, regardless of the properties of the valve body 1.

(5) As it is possible to use not only a manual driving system but also an electrical driving system or a pneumatical driving system to drive the upper stem 3 and the lower stem 4, the valve can be used under conditions where opening and closing are frequently repeated, remote operation is necessary, or unmanned operation is required such as in a dangerous site, etc.

[Description of References]

| 1 | valve body |
|---|---|
| 2 | seat ring |
| 3 | upper stem |
| 4 | lower stem |
| 5 | valve element |
| 6 | upper ring |
| 7 | lower ring |
| 8 | upper bush |
| 9 | lower bush |
| 10 | bearing |
| 11 | top flange |
| 12 | rib |
| 13 | flange bolt hole |
| 14 | flow passage |
| 15 | seat cushion |
| 16 | through hole |
| 17 | through hole |
| 18 | flange sealing surface |
| 19 | groove |
| 20 | groove |
| 21 | upper boss portion |
| 22 | lower boss portion |
| 23 | valve element insert |
| 24 | protrusion |
| 25 | protrusion |
| 26 | mold |
| 27 | sliding core |
| 28 | core |
| 29 | groove on the upper surface of the core |
| 30 | peripheral surface of the core |
| 31 | side portion of the flange sealing surface |
| 32 | electrical drive |
| 33 | mounting |
| 34 | stem |
| 35 | valve element insert |
| 36 | stem hole |
| 37 | upper valve body |
| 38 | lower valve body |
| 39 | seat ring |
| 40 | stem |
| 41 | valve element |
| 42 | bolt |
| 43 | flow passage |
| 44 | valve body |
| 45 | stem |
| 46 | clamp |
| 47 | non-rotatable flange |
| 48 | bolt |
| 49 | division surface |
| 50 | flange face |
| 51 | valve body |
| 52 | stem |
| 53 | clamp |
| 54 | non-rotatable flange |
| 55 | bolt |
| 56 | division surface |
| 57 | flange face |

The invention claimed is:

1. A method for manufacturing a valve which comprises a valve body provided on its inner peripheral surface with a seat ring, a stem arranged to extend in a direction substantially perpendicular to the axis of a flow passage defined in the valve body, and a valve element rotatably supported through a bush attached to the stem, and which opens or closes the flow passage by pressing or separating the valve element against or from the seat ring of the valve body in accordance with the rotation of the valve element;

wherein the method comprises:

assembling the valve element, the seat ring, the stem, the bush, a bearing attached to an outer periphery of an upper part of the stem and rings attached around through holes which are provided at an upper part and a lower part of an outer periphery of the seat ring;

placing the valve element, the seat ring, the stem, the bush, the bearing and the rings, assembled together, in predetermined positions in a mold in such a manner that the valve element is placed in a direction substantially perpendicular to a virtual plane corresponding to a cross section of the flow passage; and after the placing, molding the valve body in the mold.

* * * * *